(12) United States Patent
Kim

(10) Patent No.: US 12,013,012 B2
(45) Date of Patent: Jun. 18, 2024

(54) THIN CYCLOIDAL SPEED REDUCER AND MANUFACTURING METHOD THEREOF

(71) Applicant: BONSYSTEMS CO., LTD., Changwon-si (KR)

(72) Inventor: Chang-Hyun Kim, Changwon-si (KR)

(73) Assignee: BONSYSTEMS CO., LTD., Changwon-si (KR)

( * ) Notice: Subject to any disclaimer, the term of this patent is extended or adjusted under 35 U.S.C. 154(b) by 0 days.

(21) Appl. No.: 17/435,690

(22) PCT Filed: Jul. 31, 2020

(86) PCT No.: PCT/KR2020/010108
§ 371 (c)(1),
(2) Date: Sep. 1, 2021

(87) PCT Pub. No.: WO2021/187681
PCT Pub. Date: Sep. 23, 2021

(65) Prior Publication Data
US 2022/0325780 A1    Oct. 13, 2022

(30) Foreign Application Priority Data
Mar. 19, 2020  (KR) .................. 10-2020-0033613
Jul. 1, 2020    (KR) .................. 10-2020-0080948

(51) Int. Cl.
*F16H 1/32*    (2006.01)
*F16H 57/023*  (2012.01)

(52) U.S. Cl.
CPC ............ *F16H 1/32* (2013.01); *F16H 57/023* (2013.01); *F16H 2001/325* (2013.01); *F16H 2001/327* (2013.01)

(58) Field of Classification Search
CPC .... F16H 1/32; F16H 57/023; F16H 2001/325; F16H 2001/327
USPC .................................................. 475/178, 179
See application file for complete search history.

(56) References Cited

U.S. PATENT DOCUMENTS

| | | | | |
|---|---|---|---|---|
| 1,694,031 A | * | 12/1928 | Forsberg | F16H 1/32 475/168 |
| 2,170,951 A | * | 8/1939 | Perry | F16H 1/32 475/159 |
| 2,475,504 A | * | 7/1949 | Jackson | F16H 1/32 475/179 |
| 3,160,032 A | * | 12/1964 | Black | F16H 1/32 74/462 |

(Continued)

FOREIGN PATENT DOCUMENTS

| | | | | |
|---|---|---|---|---|
| CN | 107387677 A | * | 11/2017 | ............... F16H 1/32 |
| CN | 110067834 A | * | 7/2019 | |

(Continued)

OTHER PUBLICATIONS

International Search Report for PCT/KR2020/010108 dated Dec. 18, 2020 from Korean Intellectual Property Office.

*Primary Examiner* — Sherry L Estremsky
(74) *Attorney, Agent, or Firm* — Revolution IP, PLLC

(57) ABSTRACT

The present invention relates to a cycloidal speed reducer and a manufacturing method thereof, and more particularly, to a thin cycloidal speed reducer and a manufacturing method thereof that are capable of achieving a thin structure through an input member with a hollow portion.

4 Claims, 12 Drawing Sheets

(56) References Cited

U.S. PATENT DOCUMENTS

| | | | | |
|---|---|---|---|---|
| 3,975,973 A | * | 8/1976 | Haase | B65G 23/08 |
| | | | | 475/345 |
| 4,338,831 A | * | 7/1982 | Rodaway | F16H 3/70 |
| | | | | 475/904 |
| 4,909,102 A | * | 3/1990 | Haga | H02K 7/08 |
| | | | | 475/179 |
| 5,951,427 A | * | 9/1999 | Schroeder | F16H 1/32 |
| | | | | 475/178 |
| 6,761,660 B2 | * | 7/2004 | Lim | F16H 1/32 |
| | | | | 475/179 |
| 9,752,653 B1 | * | 9/2017 | Yao | F16H 1/32 |
| 10,479,199 B2 | * | 11/2019 | Niimura | F16D 13/52 |
| 2018/0320759 A1 | | 11/2018 | Tsai et al. | |

FOREIGN PATENT DOCUMENTS

| | | | |
|---|---|---|---|
| JP | 2015-064064 A | | 4/2015 |
| JP | 6554578 B2 | | 7/2019 |
| KR | 10-0884819 B1 | | 2/2009 |
| KR | 10-2013-0045691 A | | 5/2013 |
| KR | 10-1690151 B1 | | 12/2016 |
| KR | 10-1855712 B1 | | 5/2018 |
| KR | 10-2054257 B1 | | 1/2020 |
| KR | 20-2020-0000045 U | | 1/2020 |
| KR | 10-2020-0015360 A | | 2/2020 |
| WO | WO-2012139674 A1 | * | 10/2012 ............ F03D 15/00 |

* cited by examiner

THIN CYCLOIDAL SPEED REDUCER AND MANUFACTURING METHOD THEREOF

TECHNICAL FIELD

The present invention relates to a cycloidal speed reducer and a manufacturing method thereof, and more particularly, to a thin cycloidal speed reducer and a manufacturing method thereof that are capable of achieving a thin structure through an input member with a hollow portion.

BACKGROUND ART

Generally, a speed reducer is a mechanism for reducing a high speed low torque received from a power device to output a low speed high torque and may have various shapes according to the purposes thereof.

In specific, a cycloidal speed reducer can perform high torque transmission even in a small volume, high reduction ratio achievement, and rolling contact, thereby providing high efficiencies in use, so that the cycloidal speed reducer is widely used as a speed reducer of various mechanical devices. Further, the applicable places of the cycloidal speed reducer are gradually expanded.

The cycloidal speed reducer generally includes an input shaft, an external gear as a cycloidal disc, an internal gear having rolling pins that meshes with the external gear, an eccentric shaft, and an output shaft.

Recently, in specific, studies on new tooth profile design technologies have been actively made to develop a specialized speed reducer having specific purposes such as higher reduction, precision and miniaturization than existing speed reduction systems, but up to now, most of speed reducers utilizing the new tooth profile design technologies have low durability and short service life and fail to obtain a wide range of reduction ratio.

DISCLOSURE

Technical Problem

To solve the above-mentioned problems, accordingly, a thin cycloidal speed reducer and a manufacturing method thereof according to the present invention have the following objects.

It is an object of the present invention to provide a thin cycloidal speed reducer and a manufacturing method thereof that are capable of ensuring a high reduction ratio and improving durability and quietness.

It is another object of the present invention to provide a thin cycloidal speed reducer and a manufacturing method thereof that are capable of providing a thin structure, thereby enhancing a degree of freedom in designing a device to which the cycloidal speed reducer is applied.

The technical problems to be achieved through the present invention are not limited as mentioned above, and other technical problems not mentioned herein will be obviously understood to one of ordinary skill in the art through the following description.

Technical Solution

To accomplish the above-mentioned objects, according to one aspect of the present invention, there is provided a thin cycloidal speed reducer including: a cylindrical input member having an insertion hole formed therein to insert an output shaft of a motor; a first external gear having a first hollow portion adapted to insert a first area formed on the outer peripheral surface of the input member; a second external gear having a second hollow portion adapted to insert a second area formed on the outer peripheral surface of the input member; a lower housing having an internal gear formed on the inner peripheral surface thereof with the tooth profile corresponding to the tooth profile of the outer peripheral surfaces of the first external gear and the second external gear; and an output member having a third hollow portion adapted to insert the outer peripheral surface of the input member and rotating at a reduced speed based on the eccentric rotation of the first external gear and the second external gear, wherein the first area is formed around a first eccentric axis spaced apart from the center axis of the insertion hole by a predetermined distance in one side direction thereof, and the second area is formed around a second eccentric axis spaced apart from the center axis of the insertion hole by a predetermined distance in the other side direction thereof.

Desirably, the input member has a key slot formed on a given area of the outer peripheral surface thereof in a longitudinal direction thereof.

Desirably, between the first area and the second area, a separation area is formed to separate the first external gear and the second external gear from each other.

Desirably, the first external gear and the second external gear are epitrochoid external gears, and the internal gear is an epitrochoid internal gear.

Desirably, the first external gear and the second external gear are hypotrochoid external gears, and the internal gear is a hypotrochoid internal gear.

Desirably, the internal gear is an internal gear ring coupled to the inner peripheral surface of the lower housing.

Desirably, the thin cycloidal speed reducer according to the present invention may further include: a first bearing member disposed between the outer peripheral surface of the first area and the inner peripheral surface of the first external gear; and a second bearing member disposed between the outer peripheral surface of the second area and the inner peripheral surface of the second external gear.

Desirably, the thin cycloidal speed reducer according to the present invention may further include a third bearing member disposed between the outer peripheral surface of the input member and the inner peripheral surface of the output member.

Desirably, the thin cycloidal speed reducer according to the present invention may further include an upper housing whose underside is coupled to top of the lower housing.

To accomplish the above-mentioned objects, according to another aspect of the present invention, there is provided a method for manufacturing a thin cycloidal speed reducer including a cylindrical input member having an insertion hole formed therein to insert an output shaft of a motor, a first external gear and a second external gear fitted to the outer peripheral surface of the input member, a lower housing having the tooth profile corresponding to the tooth profile of the outer peripheral surfaces of the first external gear and the second external gear, and an output member rotating at a reduced speed based on the eccentric rotation of the first external gear and the second external gear, the method including the steps of: coupling a lower cover having a fourth hollow portion to the underside of the lower housing; forcibly fitting a fourth bearing member to the fourth hollow portion of the lower cover; preparing the input member having a first area formed around a first eccentric axis spaced apart from the center axis of the insertion hole by a predetermined distance in one side direction thereof, a second area formed around a second eccentric axis spaced apart from the center axis of the insertion hole by a predetermined distance in the other side direction thereof, a third area extended from top of the second area around the center axis of the insertion hole, and a fourth area extended from underside of the first area around the center axis of the insertion hole; coupling the input member to the lower housing by forcibly fitting a first bearing member to the first area of the input member and inserting the fourth area of the input member into the hollow portion of the fourth bearing member; coupling the first external gear to the first bearing member by inserting the first bearing member into a first hollow portion formed at the center of the first external gear; after a second bearing member is coupled to the second area of the input member, coupling the second external gear to the second bearing member by inserting the second bearing member into a second hollow portion formed at the center of the second external gear; coupling a third bearing member to the input member by fitting the inner peripheral surface of the third bearing member onto the fourth area of the input member; preparing the output member; coupling the output member to the third bearing member, the first external gear, and the second external gear; and coupling an upper housing to the lower housing.

Desirably, the output member may include: an output plate having a third hollow portion formed at the center thereof and a plurality of output pin holes formed radially around the center of the third hollow portion; a plurality of output pins having one side portion inserted into the plurality of output pin holes; a plurality of bushes coupled to the other side portion of the plurality of output pins; and a fifth bearing member fitted to the outer peripheral surface of the output plate.

Desirably, the step of preparing the output member may include the steps of: fittingly inserting the plurality of output pins into the plurality of output pin holes of the output plate; coupling the fifth bearing member to the outer peripheral surface of the output plate; and fitting the plurality of bushes onto the other side of the plurality of output pins.

Desirably, the first external gear has a plurality of first output holes arranged radially around the center of the first hollow portion, and the second external gear has a plurality of second output holes arranged radially around the center of the second hollow portion.

Desirably, the step of coupling the output member to the third bearing member, the first external gear, and the second external gear is carried out by inserting the third bearing member into the third hollow portion of the output member and inserting the plurality of bushes of the output member into the plurality of first output holes of the first external gear and the plurality of second output holes of the second external gear.

Advantageous Effects

According to the present invention, the thin cycloidal speed reducer and the manufacturing method thereof can achieve the thin structure through the input member having the insertion hole, the lower housing having the internal gear, the two external gears, and the output member, so that the cycloidal speed reducer can be manufactured efficiently and stably.

Moreover, the thin cycloidal speed reducer according to the present invention can require a smaller number of roller pins than the number of roller pins needed in the conventional cycloidal speed reducer, thereby being easily manufactured at a low manufacturing cost.

The effects of the present invention are not limited thereto, and other effects of the present invention will be clearly understood to those skilled in the art from the following description.

MODE FOR INVENTION

Figure 1:
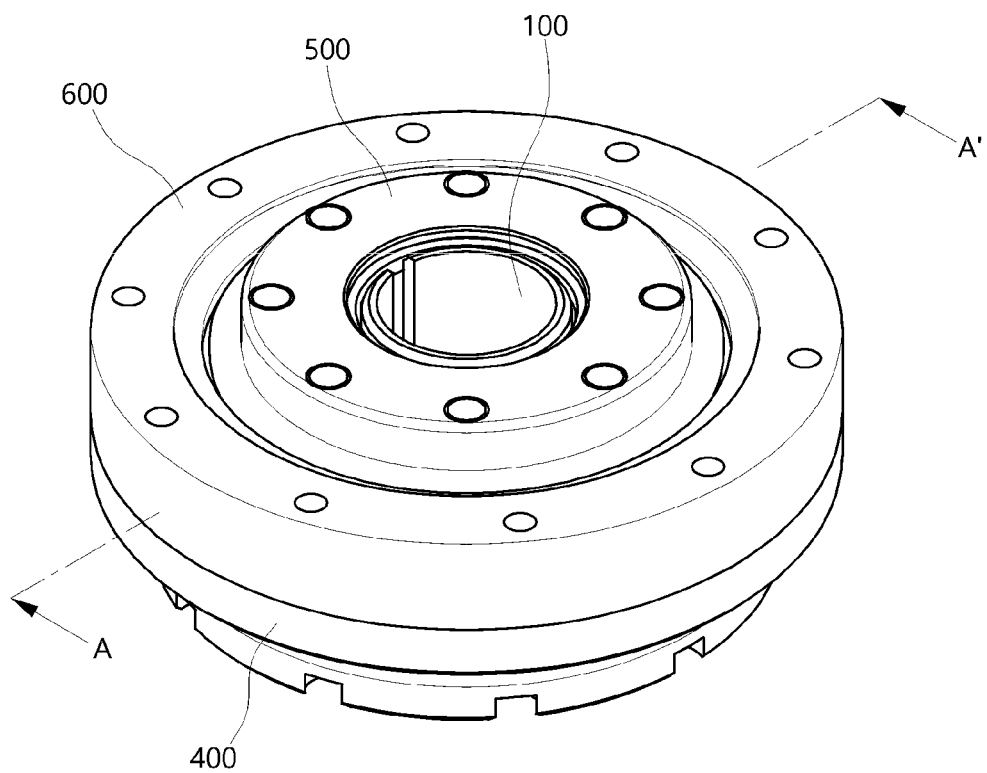
FIG. 1 is a perspective view showing a thin cycloidal speed reducer according to the present invention, which is viewed in one side direction thereof.
Figure 2:
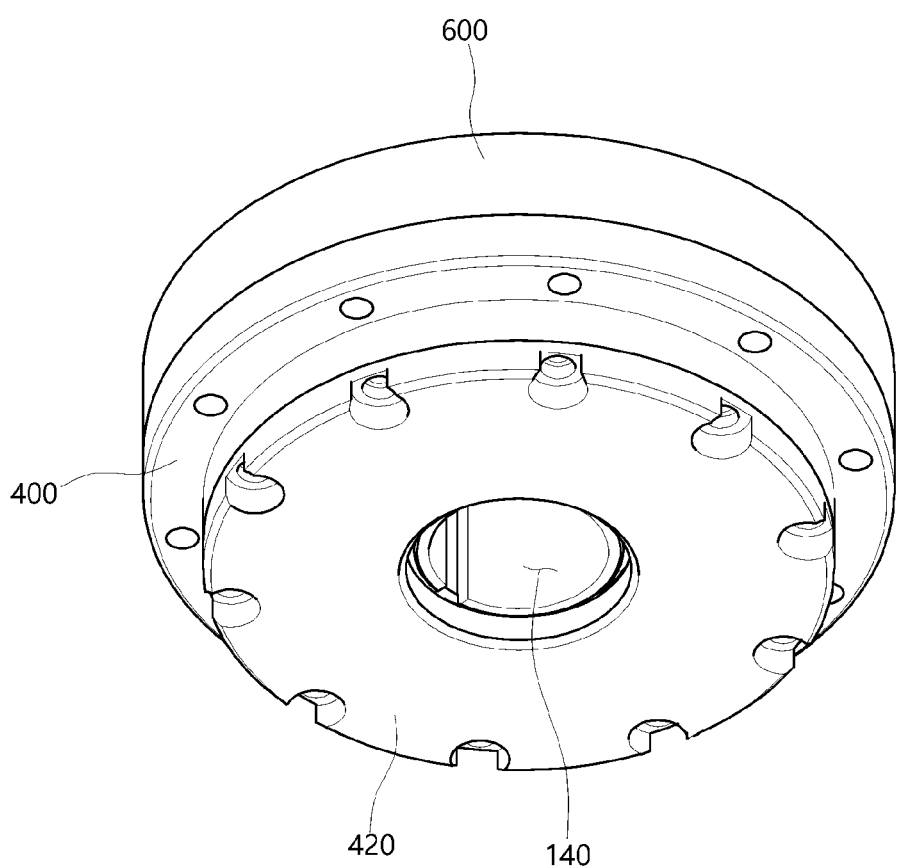
FIG. 2 is a perspective view showing the thin cycloidal speed reducer according to the present invention, which is viewed in the other side direction thereof.
Figure 3:
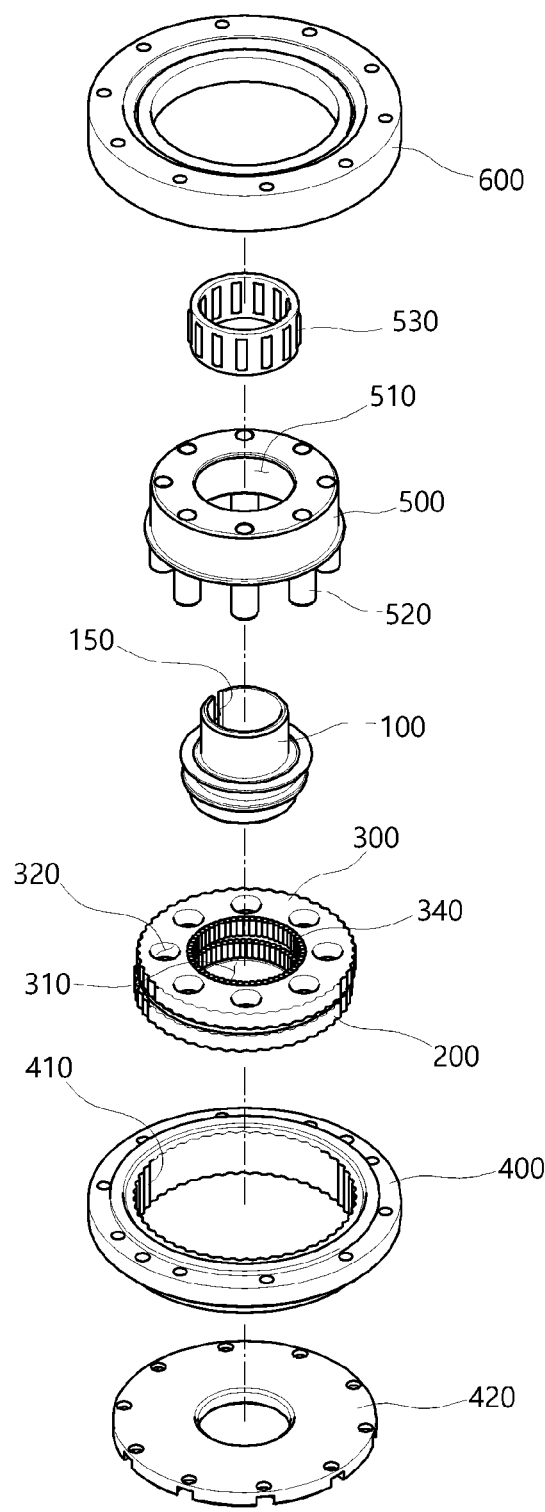
FIG. 3 is an exploded perspective view showing the thin cycloidal speed reducer according to the present invention, which is viewed in one side direction thereof.
Figure 4:
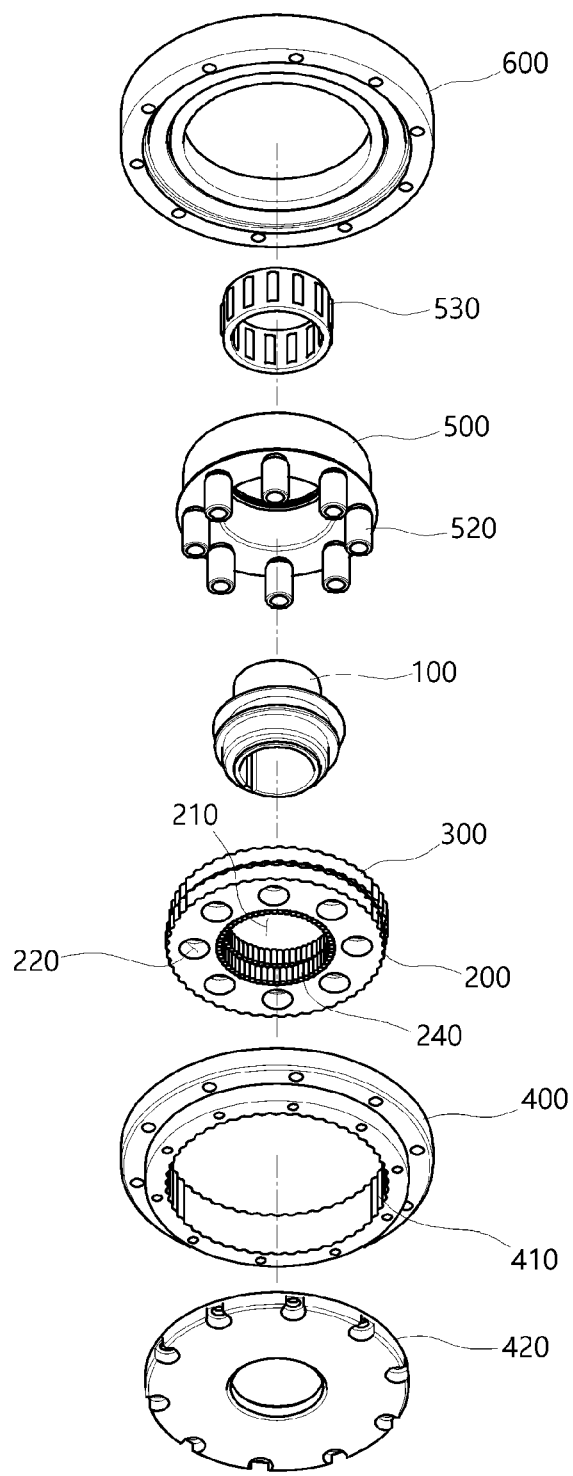
FIG. 4 is an exploded perspective view showing the thin cycloidal speed reducer according to the present invention, which is viewed in the other side direction thereof.

Hereinafter, the present invention will be disclosed in detail with reference to the attached drawings wherein the corresponding parts in the embodiments of the present invention are indicated by corresponding reference numerals and the repeated explanation on the corresponding parts will be avoided.

If it is determined that the detailed explanation on the well known technology related to the present invention makes the scope of the present invention not clear, the explanation will be avoided for the brevity of the description. The following drawings herein illustrate preferred embodiments of the present invention and serve to facilitate the general understanding of the scope of the present invention, together with the detailed description of the present invention. Therefore, the present invention is not limitedly interpreted only with the attached drawings.

Hereinafter, an explanation of a thin cycloidal speed reducer according to the present invention will be given with reference to FIGS. 1 to 11.

As shown in FIGS. 1 to 9, a thin cycloidal speed reducer according to the present invention includes an input member 100, a first external gear 200, a second external gear 300, a lower housing 400, an output member 500, and an upper housing 600.

The input member 100 is cylindrical and has an insertion hole 140 formed at the interior thereof to insert an output shaft of a motor and a key slot 150 formed on a given area of an outer peripheral surface thereof to receive a rotary force from the output shaft of the motor.

The first external gear 200 and the second external gear 300 are fittedly coupled to the outer peripheral surface of the input member 100, and according to the present invention, the thin cycloidal speed reducer is configured to allow the rotation axes of the first external gear 200 and the second external gear 300 to be arranged eccentrically to the rotation axis C0 of the input member 100.

Figure 5:
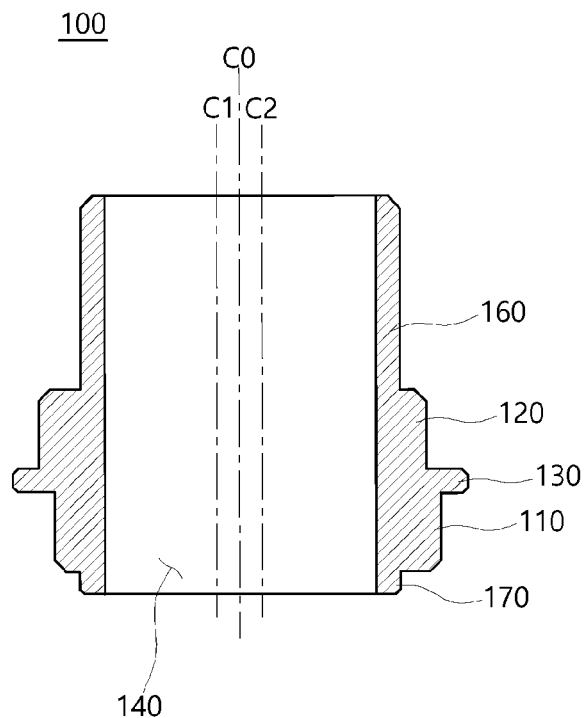
FIG. 5 is a sectional view showing the input member of the thin cycloidal speed reducer according to the present invention.
Figure 6:
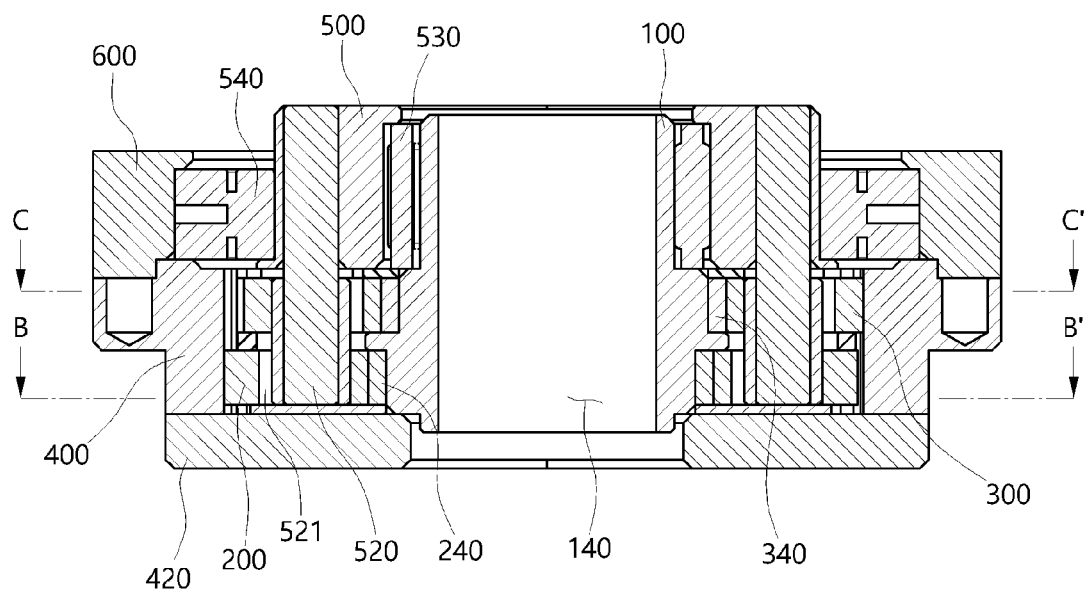
FIG. 6 is a sectional view taken along a portion A-A' of FIG. 1.

To do this, as shown in FIG. 5, the input member 100 has a first area 110, a second area 120, a third area 160, a fourth area 170, and a separation area 130 formed on the outer peripheral surface thereof.

The first area 110 is coupled to the first external gear 200 and has a first eccentric axis C1 as a center axis of the first area 110 spaced apart from the rotation axis C0 of the input member 100 by a predetermined distance in one side direction thereof.

The second area 120 is coupled to the second external gear 300 and has a second eccentric axis C2 as a center axis of the second area 120 spaced apart from the rotation axis C0 of the input member 100 by a predetermined distance in the other side direction thereof. That is, the first eccentric axis C1 and the second eccentric axis C2 are arranged to face each other around the rotation axis C0 of the input member 100, and further, a separation distance between the first eccentric axis C1 and the rotation axis C0 of the input member 100 is equal to a separation distance between the second eccentric axis C2 and the rotation axis C0 of the input member 100.

The separation area 130 is formed between the first area 110 and the second area 120, and through the separation area 130, the first external gear 200 and the second external gear 300 can rotate, without any interference with each other.

The third area 160 is extended from top of the second area 120, and the fourth area 170 from the underside of the first area 110. The third area 160 and the fourth area 170 have the same axis as the center axis C0 of the insertion hole 140 of the input member 100.

The first external gear 200 is rotatably coupled to the first area 110 formed on the outer peripheral surface of the input member 100 and has a first hollow portion 210 formed at the center thereof and thus coupled to the first area 110 and a plurality of first output holes 220 arranged radially around the center of the first hollow portion 210.

Further, the first external gear 200 has a first bearing member 240 located on the inner peripheral surface thereof, that is, between the side periphery of the first hollow portion 210 and the outer periphery of the first area 110, thereby ensuring gentle rotation thereof.

The second external gear 300 is rotatably coupled to the second area 120 formed on the outer peripheral surface of the input member 100 and has a second hollow portion 310 formed at the center thereof and thus coupled to the second area 120 and a plurality of second output holes 320 arranged radially around the center of the second hollow portion 310.

Further, the second external gear 300 has a second bearing member 340 located on the inner peripheral surface thereof, that is, between the side periphery of the second hollow portion 310 and the outer periphery of the second area 120, thereby ensuring gentle rotation thereof.

The lower housing 400 serves to accommodate the lower periphery of the input member 100, the first external gear 200, and the second external gear 300 therein and has internal teeth 410 formed on the inner peripheral surface thereof in such a manner as to correspond to the tooth profiles formed on the outer peripheral surfaces of the first external gear 200 and the second external gear 300.

The lower housing 400 has a lower cover 420 located on the underside thereof to support the first external gear 200 and the second external gear 300 thereagainst, and desirably, the lower cover 420 is fastened to the lower housing 400 by means of screws.

Further, the lower cover 420 has a fourth hollow portion formed at the center thereof and thus coupled to the first area 110 of the input member 100, and in this case, a fourth bearing member (not shown) is located between the first area 110 of the input member 100 and the inner peripheral surface of the fourth hollow portion.

If the internal teeth 410 are formed unitarily with the inner peripheral surface of the lower housing 400, moreover, the manufacturing cost becomes high and it is impossible to manufacture the lower housing 400 made of a lightweight material. In consideration of the above-mentioned problems, an internal tooth ring, which has the internal teeth corresponding to the external teeth of the first external gear 200 and the second external gear 300, is coupled to the inner peripheral surface of the lower housing 400.

According to an embodiment wherein the internal tooth ring is coupled to the inner peripheral surface of the lower housing 400, the lower housing 400 is made of a lightweight material such as aluminum, silicon, and the like and the internal tooth ring is made of alloy steel having excellent strength and hardness such as SCM440, so that the wearing of internal teeth generated by the operation of the cycloidal speed reducer can be prevented and the whole weight of the cycloidal speed reducer assembly can be greatly reduced.

However, if the internal tooth ring is not coupled firmly to the inner peripheral surface of the lower housing 400 and thus rotates together with the rotation of the first external gear 200 and the second external gear 300, the speed reduction may not be carried out well. Hereinafter, various coupling examples wherein the internal tooth ring is coupled firmly to the lower housing 400 will be explained.

As a first coupling example, the internal tooth ring is located on an area of the inner peripheral surface of the lower housing 400 that corresponds to the areas where the first external gear 200 and the second external gear 300 are disposed, and the inner peripheral surface of the lower housing 400 and the outer peripheral surface of the internal tooth ring are fixed to each other by means of welding.

Accordingly, the internal tooth ring can be fixed to the inner peripheral surface of the lower housing 400 in a simple manner, but if the materials of the lower housing 400 and the internal tooth ring are different from each other, it is difficult to perform the welding itself. Further, if the cycloidal speed reducer is used for a long period of time, the welded portion may be damaged or broken.

As a second coupling example, a stepped protrusion is formed on the inner peripheral surface of the lower housing 400 to support the lower peripheral surface of the internal tooth ring thereagainst, and the internal tooth ring is forcibly fitted to the inner peripheral surface of the lower housing 400.

In the case where a thermal expansion coefficient of a material constituting the internal tooth ring is greater than that of a material constituting the lower housing 400, in specific, if the internal tooth ring is forcibly fitted to the inner peripheral surface of the lower housing 400 in cold working, the expansion rate of the internal tooth ring is greater than that of the lower housing 400 at a room temperature, so that the internal tooth ring can be coupled firmly to the inner peripheral surface of the lower housing 400.

In a situation where the cycloidal speed reducer is driven by the rotary force of the motor, in specific, a temperature of the cycloidal speed reducer is higher than a room temperature, so that advantageously, the internal tooth ring can be coupled more firmly to the inner peripheral surface of the lower housing 400.

As a third coupling example, at least one guide groove is formed on the inner peripheral surface of the lower housing 400, and a guide protrusion corresponding to the guide groove is formed on the outer peripheral surface of the internal tooth ring.

Accordingly, the rotation of the internal tooth ring inside the lower housing 400 can be prevented, and in the same manner as the second coupling example, if the stepped protrusion is formed on the inner peripheral surface of the lower housing 400 to support the lower peripheral surface of the internal tooth ring thereagainst, accurate arrangement of the internal tooth ring in up and down directions can be ensured.

To improve the strength of the internal tooth ring forcibly fitted to the lower housing 400, the guide protrusion formed on the outer peripheral surface of the internal tooth ring may be tapered, and in this case, the tapering on the guide protrusion may be machined correspondingly to that on the guide groove or protrusion formed on the inner peripheral surface of the lower housing 400.

As a fourth coupling example which is contrary to the third coupling example, at least one guide groove is formed on the outer peripheral surface of the internal tooth ring, and a guide protrusion corresponding to the guide groove is formed on the inner peripheral surface of the lower housing 400. Further, it is of course possible that a first guide groove and a first guide protrusion may be formed on the outer peripheral surface of the internal tooth ring, and a second guide protrusion and a second guide groove corresponding to the first guide groove and the first guide protrusion may be formed on the inner peripheral surface of the lower housing 400.

Further, it is of course possible that only the guide grooves may be formed on the outer peripheral surface of the internal tooth ring and the inner peripheral surface of the lower housing 400 and a separate pin member is fastened to a coupling groove formed by the guide groove of the internal tooth ring and the guide groove of the lower housing 400, thereby allowing the internal tooth ring to be coupled firmly to the inner peripheral surface of the lower housing 400.

As mentioned above, the first external gear 200 and the second external gear 300 provide a two-stage structure which is inserted into the first area 110 and the second area 120 of the input member 100. The first external gear 200 rotates around the first eccentric axis C1, while orbiting along the internal teeth 410 around the rotation axis C0 of the input member 100, and the second external gear 300 rotates around the second eccentric axis C2, while orbiting along the internal teeth 410 around the rotation axis C0 of the input member 100.

Figure 7:
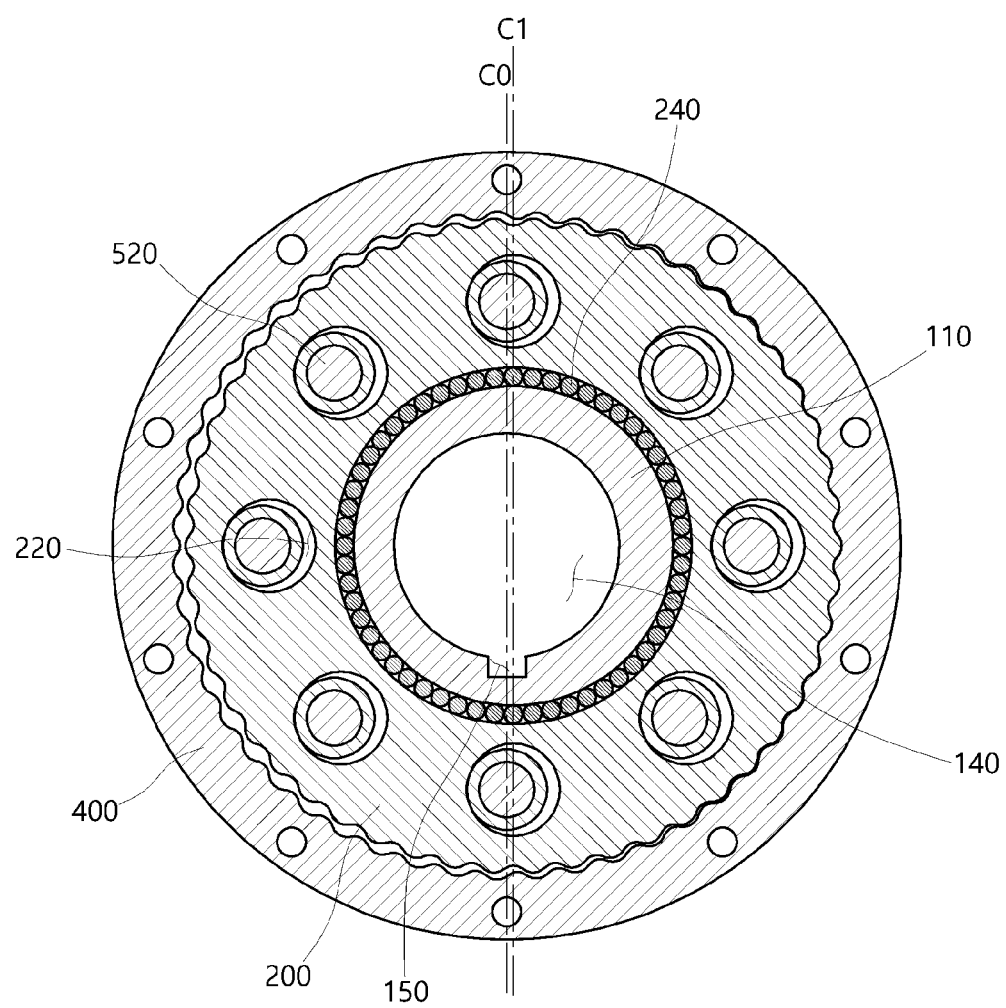
FIG. 7 is a sectional view taken along a portion B-B' of FIG. 6.
Figure 8:
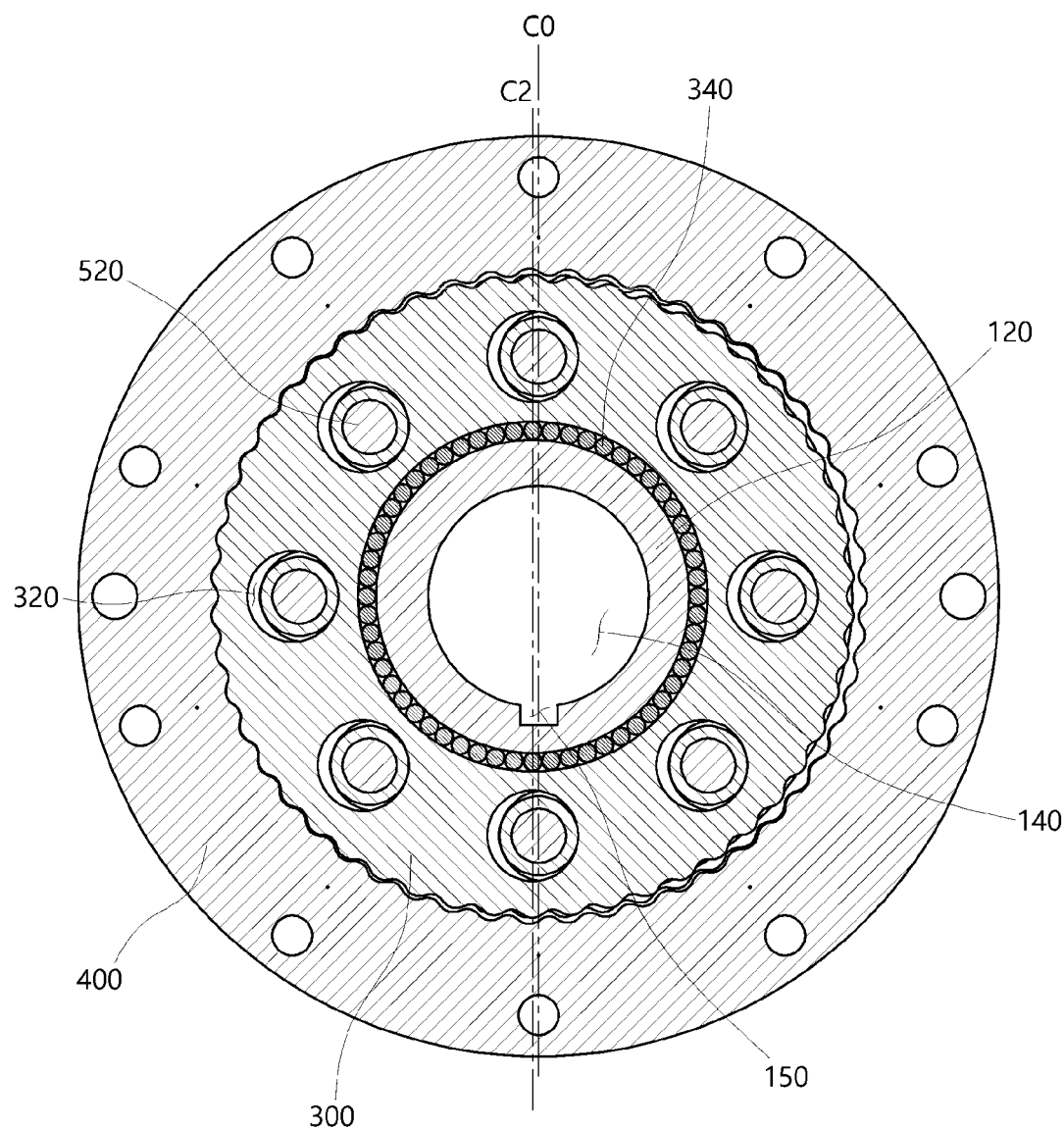
FIG. 8 is a sectional view taken along a portion C-C' of FIG. 6.

That is, the first external gear 200 and the second external gear 300 rotate eccentrically around the rotation axis C0 of the input member 100, and in specific, as shown in FIGS. 7 and 8, the first external gear 200 and the second external gear 300 rotate eccentrically to have a phase of 180° with respect to each other.

If only a single external gear is provided, the entire load and the weight center of the cycloidal speed reducer may be consistently changed to cause various problems, such as noise, vibrations, and the like, and as mentioned above, accordingly, the first external gear 200 and the second external gear 300 rotate eccentrically to have a phase of 180° with respect to each other, thereby solving the above-mentioned problems.

Figure 9:
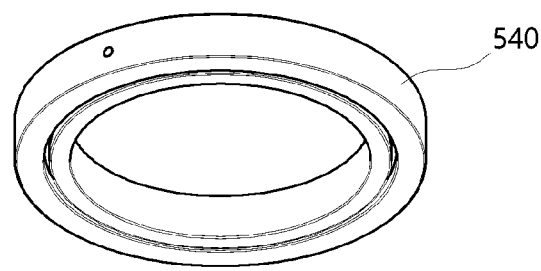
FIG. 9 is an exploded perspective view showing the output member of the thin cycloidal speed reducer according to the present invention.
Figure 9:
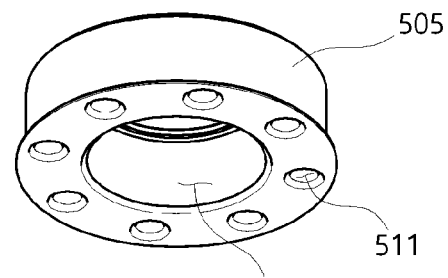
Figure 9:
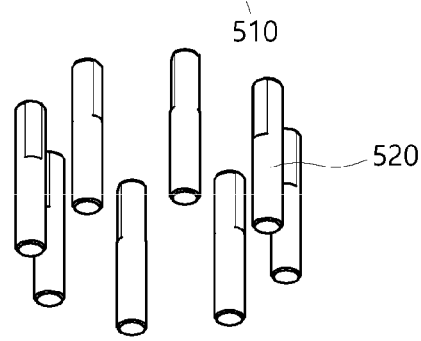
Figure 9:
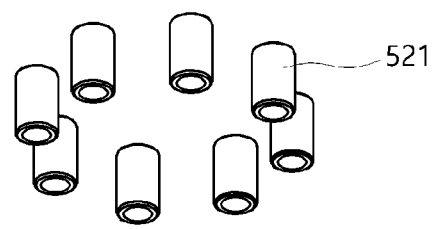

As shown in FIG. 9, the output member 500 includes an output plate 505, output pins 520, bushes 521, and a fifth bearing member 540.

The output plate 505 has a third hollow portion 510 formed at the center thereof to insert the outer peripheral surface of the input member 100, that is, the third area 160 of the input member 110 thereinto and a plurality of output pin holes 511 formed radially around the center of the third hollow portion 510.

The output pins 520 have one side portion inserted into the output pin holes 511 of the output plate 505, and to prevent the output pins 520 from rotating within the output pin holes 511, in this case, the output pins 520 have one side portion angled as shown in FIG. 9. Accordingly, the inner peripheral surfaces of the output pin holes 511 have to be angled correspondingly to one side portion of the output pins 520.

The bushes 521 are coupled to the other side portion of the output pins 520 and thus inserted into the first output holes 220 of the first external gear 200 and the second output holes 320 of the second external gear 300.

The bushes 521 have to be formed correspondingly to the first output holes 220 and the second output holes 320, and a diameter of each bush 521 has to be smaller than diameters of each first output hole 220 and each second output hole 320, which will be explained in detail later.

Moreover, the fifth bearing member 540 is fitted to the outer peripheral surface of the output plate 505, and that is, the fifth bearing member 540 is fitted between the inner peripheral surface of the upper housing 600 as will be discussed later and the outer peripheral surface of the output plate 505, thereby ensuring gentle rotation of the output member 500.

Moreover, a third bearing member 530 is fitted to the side peripheral surface of the third hollow portion 510 of the output plate 505, that is, between the inner peripheral surface of the output plate 505 and the third area 160 of the input member 100 to thus ensure the gentle rotation of the output member 500.

If the motor is driven, that is, the input member 100 rotates, and based on the rotation of the input member 100, the first external gear 200 and the second external gear 300 rotate eccentrically to face each other along the internal teeth 410 of the lower housing 400.

After that, the output pins 520 rotate by the rotation of the first hollow portion 210 and the second hollow portion 310 when the first external gear 200 and the second external gear 300 rotate eccentrically, and accordingly, the output member 500 rotates to a speed reduced by a predetermined reduction ratio at the rotation speed of the motor.

As shown in FIGS. 1 to 4, the upper housing 600 is coupled to top of the lower housing 400 and protects the output member 500 from the outside, and even if not shown, the upper housing 600 has an oil seal forcibly fitted to the interior thereof to prevent a lubricant from leaking to the outside from the interior of the thin cycloidal speed reducer.

Further, curves, which are applied to the external teeth formed on the first external gear 200 and the second external gear 300 and the internal teeth 410 formed on the inner peripheral surface of the lower housing 400 of the thin cycloidal speed reducer according to the present invention, are largely classified into an epitrochoid curve that is traced by a point attached to a rolling circle rolling on the outside of a base circle and a hypotrochoid curve that is traced by a point attached to a rolling circle rolling on the inside of a base circle.

Also, the offset curves to the epitrochoid and hypotrochoid curves are called "epitrochoid-like and hypotrochoid-like curves", which are typically used as the tooth profile of the cycloidal speed reducer.

Figure 10:
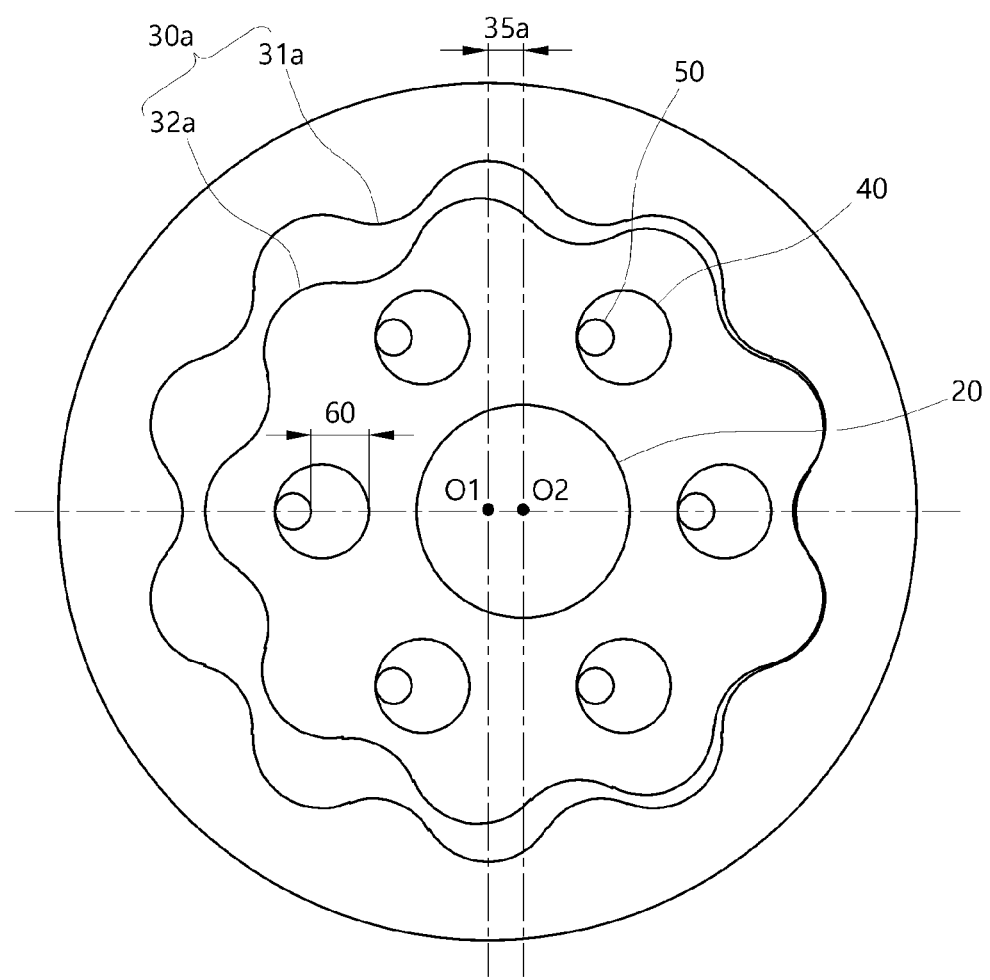
FIGS. 10 and 11 are concept views showing the driving states of the thin cycloidal speed reducer according to the present invention.
Figure 11:
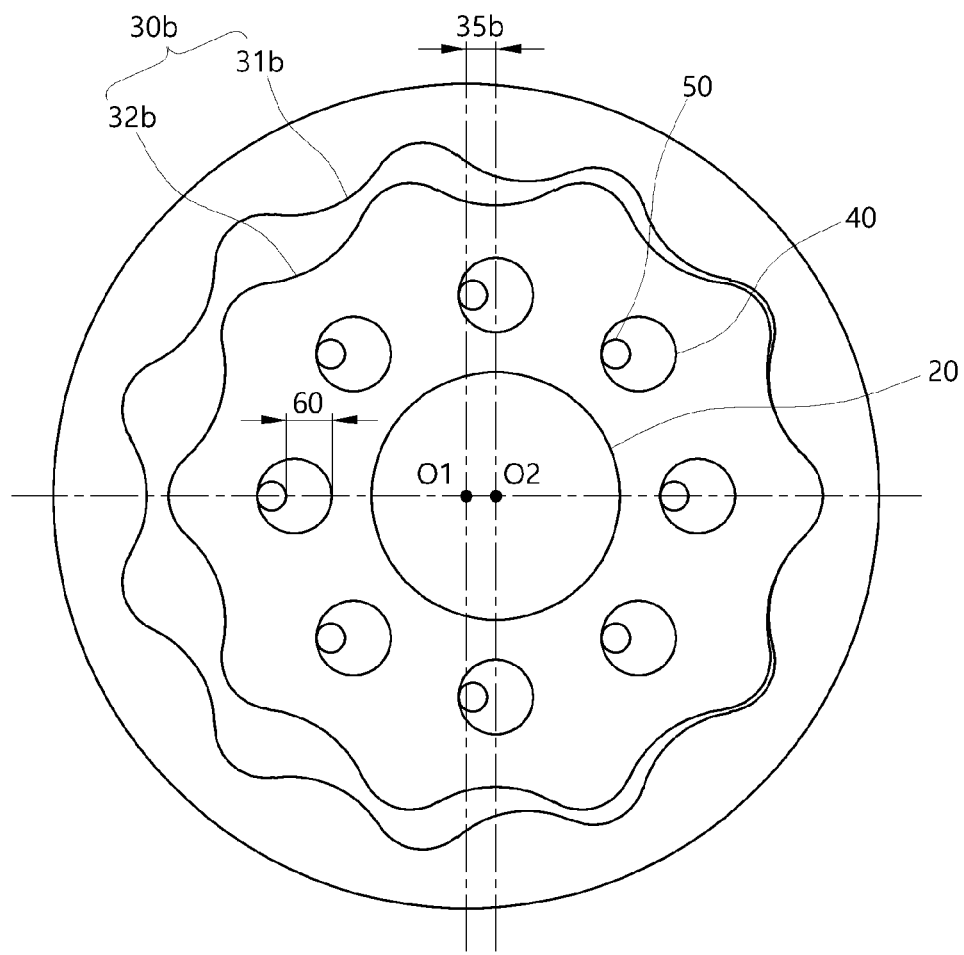

According to the present invention, the thin cycloidal speed reducer may be configured to have a dual epi internal gear pair system made by the engagement between the epitrochoid gears of the same kind, as shown in FIG. 10, and otherwise, the thin cycloidal speed reducer may be configured to have a dual hypo internal gear pair system made by the engagement between the hypotrochoid gears of the same kind, as shown in FIG. 11.

In specific, as shown in FIG. 10, an epi internal gear 31a and an epi external gear 32a are provided as the internal gear and the external gear, thereby building the dual epi internal gear pair system, and otherwise, as shown in FIG. 11, a hypo internal gear 31b and a hypo external gear 32b are provided as the internal gear and the external gear, thereby building the dual hypo internal gear pair system.

In the case of the cycloidal speed reducer adopting the dual epi internal gears as shown in FIG. 10 and the dual hypo internal gears as shown in FIG. 11, the external gears roll to contact with the internal gears, while the centers of the external gears are eccentric to the internal gears by predetermined lengths 35a and 35b, and a difference between the number of teeth of the internal gears and the number of teeth of the external gears is freely designed with a given k teeth difference, thereby advantageously obtaining various reduction ratios.

Unlike the existing cycloidal speed reducer, further, the external gear and the internal gear of the cycloidal speed reducer according to the present invention theoretically come into contact with each other at a point, thereby advantageously providing easy manufacturing and coupling, but they have low torsional rigidity, thereby disadvantageously providing low durability.

According to secondary characteristics of the present invention to solve such a problem as mentioned above, the dual epi internal gear is constituted of helical gears for the epi external gear and the epi internal gear that have the same torsional direction in tooth space directions thereof and the helix angle of the same size, and accordingly, the dual epi internal gear made by the engagement between the epi internal gear and the epi external gear having the helix angle of the same size is constituted of the helical epi internal gears.

Further, the dual hypo internal gear is constituted of helical gears for the hypo external gear and the hypo internal gear that have the same torsional direction in tooth space directions thereof and the helix angle of the same size, and accordingly, the dual hypo internal gear made by the engagement between the hypo internal gear and the hypo external gear having the helix angle of the same size is constituted of the helical hypo internal gears.

As a result, when the helical internal gear of the epi or hypo internal gear having the helix angle of the helical epi internal gear or helical hypo internal gear engages the helical external gear of the epi or hypo external gear having the helix angle of the helical epi internal gear or helical hypo internal gear to thus cause rotation, a contact occurs first on one side of teeth, and as the rotation is developed, the contact is extended in the tooth space direction.

As the teeth increasingly engage each other, accordingly, the engagement of the gears may be more gently and quietly achieved when compared to the conventional dual epi internal gear or dual hypo internal gear having the helix angle of 0°, and such increasing engagement provides a lower dynamic coefficient and a higher rotation speed than the conventional engagement.

Moreover, it should be noted that the helical epi or hypo internal gears, which engage each other on a parallel axis, should have the same helix angle and torsional direction. In this case, the torsional direction is set in consideration of an axial thrust direction, and the value of the helix angle is typically in the range of 15 to 30°, even though not standardized. The smaller the helix angle becomes, the smaller the thrust becomes, and contrarily, the larger the helix angle becomes, the gentler the gears operate.

Further, a diameter difference 60 between each output pin 50 of the output member 500 and each output hole 40 inserting the output pin 50 that are located in the epi external gear 31a or the hypo external gear 31b has to be two times of an eccentric amount 35a or 35b between the internal gear 33a or 33b and the external gear 34a or 34b of the same kind, so that the input member and the output member can be gently connected.

Hereinafter, a method for manufacturing the thin cycloidal speed reducer according to the present invention will be explained with reference to the description on the thin cycloidal speed reducer mentioned above and FIGS. 12 and 13, and for the brevity of the description, the repeated explanation with the thin cycloidal speed reducer as mentioned above will be avoided.

Figure 12:
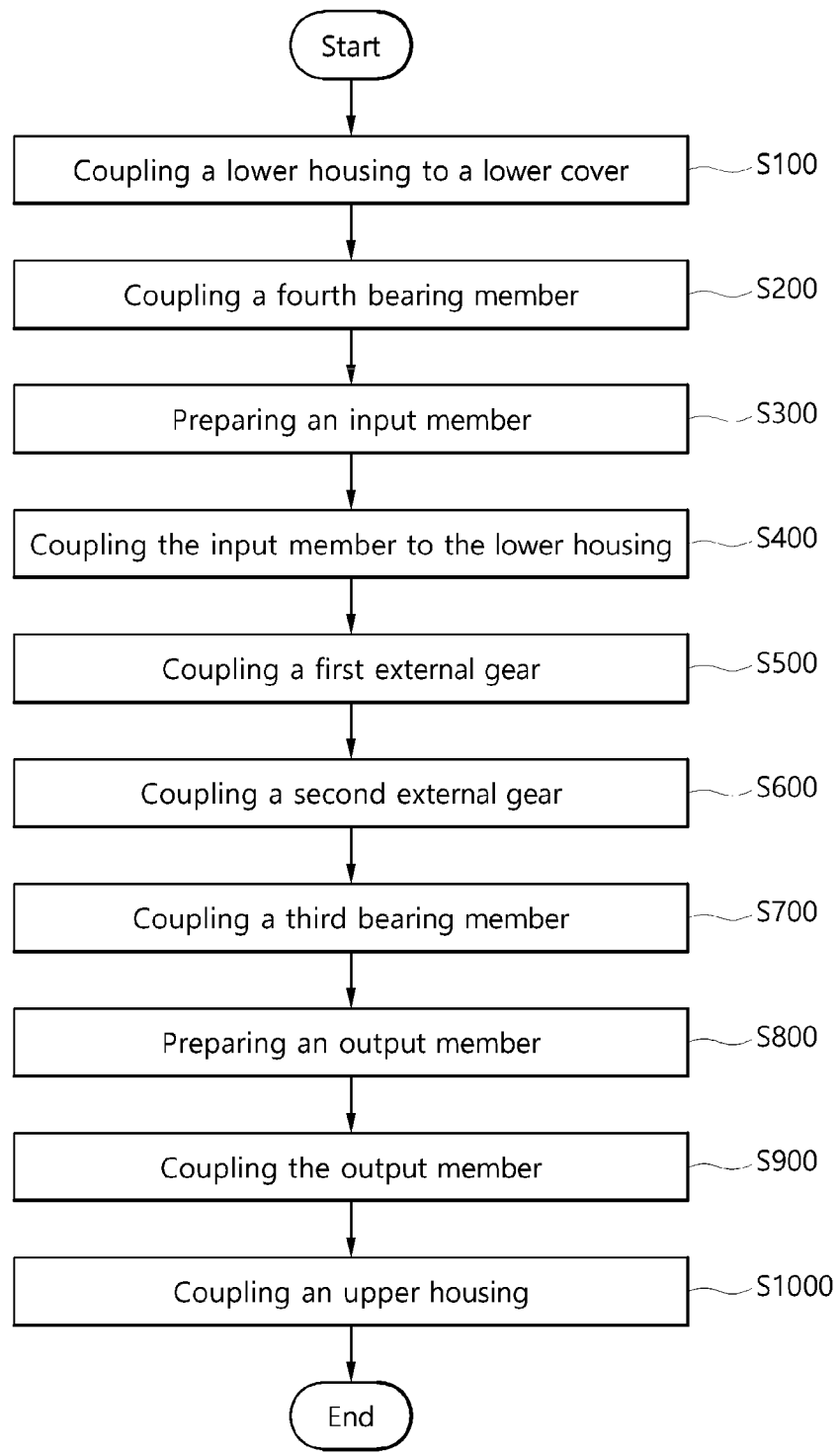
FIG. 12 is a time series flowchart showing a method for manufacturing the thin cycloidal speed reducer according to the present invention.

A method for manufacturing the thin cycloidal speed reducer according to the present invention is carried out by coupling the components of the thin cycloidal speed reducer according to the present invention, and as shown in FIG. 12, the method for manufacturing the thin cycloidal speed reducer according to the present invention includes step S100 of coupling the lower housing and the lower cover to each other, step S200 of coupling the fourth bearing member, step S300 of preparing the input member, step S400 of coupling the input member to the lower housing, step S500 of coupling the first external gear, step S600 of coupling the second external gear, step S700 of coupling the third bearing member, step S800 of preparing the output member, step S900 of coupling the output member, and step S1000 of coupling the upper housing.

First, step S100 of coupling the lower housing and the lower cover to each other is carried out by coupling the lower cover 420 having the fourth hollow portion to the underside of the lower housing 400 by means of separate coupling pins.

Moreover, in the case of an embodiment where the internal tooth ring is coupled to the lower housing 400, the internal tooth ring may be coupled to the inner peripheral surface of the lower housing 400 before step S100 of coupling the lower housing and the lower cover to each other.

Next, step S200 of coupling the fourth bearing member is carried out by forcibly fitting the fourth bearing member to the hollow portion of the lower cover 420.

After that, step S300 of preparing the input member is carried out, and as mentioned above, the input member 100 includes the first area 110 formed around the first eccentric axis C1 spaced apart from the center axis C0 of the insertion hole 140 by a predetermined distance in one side direction thereof, the second area 120 formed around the second eccentric axis C2 spaced apart from the center axis C0 of the insertion hole 140 by a predetermined distance in the other side direction thereof, the third area 160 extended from top of the second area 120 around the center axis C0 of the insertion hole 140, and the fourth area 170 extended from underside of the first area 110 around the center axis C0 of the insertion hole 140.

Further, the method for manufacturing the thin cycloidal speed reducer according to the present invention includes step of seating a first spacer onto top of the lower cover 420 between step S200 of coupling the fourth bearing member and step S300 of preparing the input member.

Next, step S400 of coupling the input member to the lower housing is carried out, which is divided into step of forcibly fitting the first bearing member 240 to the first area 110 of the input member 100 and step of coupling the input member 100 coupled to the first bearing member 240 to the lower housing 400 so that the fourth area 170 of the input member 100 is inserted into the hollow portion of the fourth bearing member.

After that, step S500 of coupling the first external gear is carried out by coupling the first external gear 200 to the first bearing member 240 so that the first bearing member 240 is inserted into the first hollow portion 210 formed at the center of the first external gear 200.

If the first spacer is seated onto the top of the lower cover 420, in this case, the underside of the first external gear 200 does not come into direct contact with the top of the lower cover 420, but comes into contact with the first spacer, so that the frictional force between the first external gear 200 and the lower cover 420 can be minimized.

Before step S500 of coupling the first external gear, further, step of applying a lubricant to the first external gear 200 may be carried out to ensure the gentle rotation of the first external gear 200.

Next, step S600 of coupling the second external gear is carried out, which is divided into step of coupling the second bearing member 340 to the second area 120 of the input member 100 coupled to the lower housing 400 and step of coupling the second external gear 300 to the second bearing member 340 so that the second bearing member 340 is inserted into the second hollow portion 310 formed at the center of the second external gear 300.

Through step S500 of coupling the first external gear and step S600 of coupling the second external gear, in specific, the first external gear 200 and the second external gear 300 are coupled correspondingly to the first eccentric axis C1 and the second eccentric axis C2 of the input member 100, so that they are located inside the lower housing 400 to have a phase difference of 180° with respect to each other.

Further, the method for manufacturing the thin cycloidal speed reducer according to the present invention may include the step of seating a second spacer onto top of the first external gear 200 between step S500 of coupling the first external gear and step S600 of coupling the second external gear. In this case, a diameter of a hollow portion of the second spacer is greater than a diameter of the separation area 130 of the input member 100.

Through the second spacer, the frictional force between top of the first external gear 200 and the underside of the second external gear 300 can be minimized.

Before step S600 of coupling the second external gear, further, step of applying a lubricant to the second external gear 300 may be carried out to ensure the gentle rotation of the second external gear 300.

After step S600 of coupling the second external gear, step S700 of coupling the third bearing member is carried out by coupling the third bearing member 530 to the input member 100 so that the inner peripheral surface of the third bearing member 530 is fitted to the third area 160 of the input member 100 already coupled to the lower housing 400.

Figure 13:
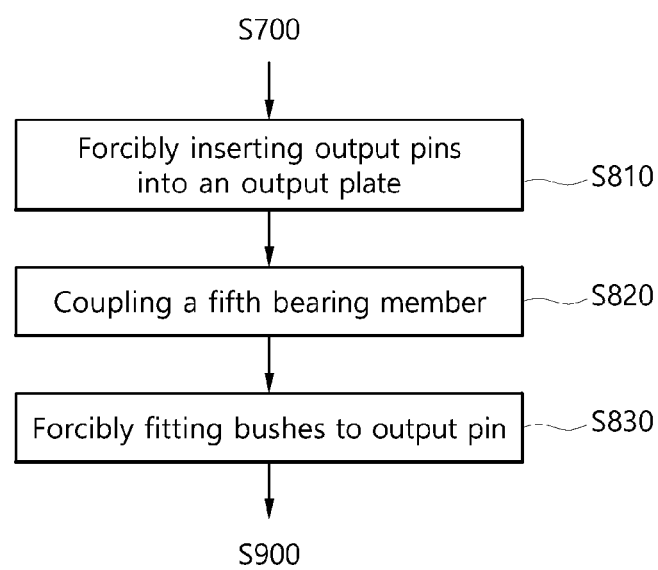
FIG. 13 is a flowchart showing specific steps constituting the step of preparing the output member at steps of FIG. 12.

After that, step S800 of preparing the output member is carried out, and as shown in FIG. 13, in specific, step S800 is divided into step S810 of forcibly fitting the output pins to the output plate, step S820 of coupling the fifth bearing member, and step S830 of forcibly fitting the bushes to the output pins.

Otherwise, step S800 may be carried out in the order of step of forcibly fitting the output pins to the output plate, step of forcibly fitting the bushes to the output pins, and step of coupling the fifth bearing member, and if necessary, the specific order of step S800 of preparing the output member may be freely determined according to equipment and situations.

Next, step S900 of coupling the output member is carried out by coupling the prepared output member 500 to the third bearing member 530, the first external gear 200, and the second external gear 300.

In specific, the third bearing member 530 coupled to the input member 100 is inserted into the third hollow portion 510 of the output member 500, and the output member 500 is coupled to the input member 100, the first external gear 200, and the second external gear 300, so that the bushes 521 of the output member 500 are inserted into the first output holes 220 of the first external gear 200 and the second output holes 320 of the second external gear 300.

Lastly, step S1000 of coupling the upper housing is carried out by coupling the upper housing 600 to the lower housing 400, and in this case, the upper housing 600 has the hollow portion through which the output member 500 is exposed. Desirably, fastening holes are formed around the peripheral areas of the upper housing 600 and the lower housing 400, and through the fastening pins or screws fitted to the fastening holes, accordingly, the upper housing 600 and the lower housing 400 can be fastened to each other.

In this case, the upper housing 600 desirably has the oil seal forcibly fitted to the interior thereof to prevent the lubricant from leaking to the outside from the interior of the thin cycloidal speed reducer.

As mentioned above, the embodiments of the present invention have been disclosed in the specification and drawings. In the description of the present invention, the embodiments are used not to limit the present invention and the scope of the present invention as defined in claims, but just to explain the present invention. Therefore, persons skilled in the relevant art can appreciate that many modifications and variations are possible in light of the above teachings. It is therefore intended that the scope of the invention be limited not by this detailed description, but rather by the claims appended hereto.

The invention claimed is:

1. A method for manufacturing a thin cycloidal speed reducer comprising a cylindrical input member having an insertion hole formed therein to insert an output shaft of a motor, a first external gear and a second external gear fitted to the outer peripheral surface of the input member, a lower housing having a tooth profile corresponding to a tooth profile of the outer peripheral surfaces of the first external gear and the second external gear, and an output member rotating at a reduced speed based on the eccentric rotation of the first external gear and the second external gear, the method comprising the steps of:

coupling a lower cover having a fourth hollow portion to the underside of the lower housing;

forcibly fitting a fourth bearing member to the fourth hollow portion of the lower cover;

preparing the input member having a first area formed around a first eccentric axis spaced apart from the center axis of the insertion hole by a predetermined distance in one side direction thereof, a second area formed around a second eccentric axis spaced apart from the center axis of the insertion hole by a predetermined distance in the other side direction thereof, a third area extended from top of the second area around the center axis of the insertion hole, and a fourth area extended from the underside of the first area around the center axis of the insertion hole;

coupling the input member to the lower housing by forcibly fitting a first bearing member to the first area of the input member and inserting the fourth area of the input member into the hollow portion of the fourth bearing member;

coupling the first external gear to the first bearing member by inserting the first bearing member into a first hollow portion formed at the center of the first external gear;

after a second bearing member is coupled to the second area of the input member, coupling the second external gear to the second bearing member by inserting the second bearing member into a second hollow portion formed at the center of the second external gear;

coupling a third bearing member to the input member by fitting the inner peripheral surface of the third bearing member onto the third area of the input member;

preparing the output member;

coupling the output member to the third bearing member, the first external gear, and the second external gear; and coupling an upper housing to the lower housing, wherein the output member comprises:

an output plate having a third hollow portion formed at the center thereof and a plurality of output pin holes formed radially around the center of the third hollow portion;

a plurality of output pins having one side portion inserted into the plurality of output pin holes;

a plurality of bushes coupled to the other side portion of the plurality of output pins; and a fifth bearing member fitted to the outer peripheral surface of the output plate.

2. The method according to claim 1, wherein the step of preparing the output member comprises the steps of:

fittingly inserting the plurality of output pins into the plurality of output pin holes of the output plate;

coupling the fifth bearing member to the outer peripheral surface of the output plate; and fitting the plurality of bushes onto the other side of the plurality of output pins.

3. The method according to claim 2, wherein the first external gear has a plurality of first output holes arranged radially around the center of the first hollow portion, and the second external gear has a plurality of second output holes arranged radially around the center of the second hollow portion.

4. The method according to claim 3, wherein the step of coupling the output member to the third bearing member, the first external gear, and the second external gear is carried out by inserting the third bearing member into the third hollow portion of the output member and inserting the plurality of bushes of the output member into the plurality of first output holes of the first external gear and the plurality of second output holes of the second external gear.

* * * * *